United States Patent
Anders et al.

(10) Patent No.: US 7,509,368 B2
(45) Date of Patent: Mar. 24, 2009

(54) SPARSE TREE ADDER CIRCUIT

(75) Inventors: Mark A. Anders, Hillsboro, OR (US);
Sanu K. Mathew, Hillsboro, OR (US);
Nanda Siddaiah, Portland, OR (US);
Sapumal Wijeratne, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 736 days.

(21) Appl. No.: 11/123,702

(22) Filed: May 9, 2005

(65) Prior Publication Data
US 2006/0253523 A1    Nov. 9, 2006

(51) Int. Cl.
*G06F 7/50* (2006.01)
(52) U.S. Cl. .................................... 708/714
(58) Field of Classification Search .................. 708/714
See application file for complete search history.

(56) References Cited

U.S. PATENT DOCUMENTS

| | | | |
|---|---|---|---|
| 4,639,888 A * | 1/1987 | Nussbaecher | 708/714 |
| 5,126,965 A * | 6/1992 | Asato et al. | 708/714 |
| 5,163,020 A * | 11/1992 | Chau | 708/714 |
| 5,327,369 A | 7/1994 | Ashkenazi | |
| 5,555,517 A | 9/1996 | Agrawal et al. | |
| 6,571,269 B1 | 5/2003 | Krishnamurthy et al. | |
| 6,839,729 B2 * | 1/2005 | Pham | 708/710 |
| 7,277,909 B2 * | 10/2007 | Shimooka | 708/714 |
| 2002/0174158 A1 | 11/2002 | Sutherland et al. | |
| 2004/0128339 A1 | 7/2004 | Kalampoukas et al. | |
| 2004/0220994 A1 | 11/2004 | Mathew et al. | |
| 2004/0225706 A1 | 11/2004 | Harris | |
| 2007/0244961 A1 * | 10/2007 | Schmit et al. | 708/700 |

OTHER PUBLICATIONS

Sanu Mathew et al.; "A 4-GHz 130-nm Address Generation Unit with 32-bit Sparse-Tree Adder Core;" IEEE Journal of Solid-State Circuits, vol. 38, No. 5, May 2003; pp. 689-695.

* cited by examiner

*Primary Examiner*—David H Malzahn
(74) *Attorney, Agent, or Firm*—Ked & Associates, LLP (57) ABSTRACT

An adder circuit is provided that includes a propagate and generate circuit stage to provide propagate and generate signals, a plurality of carry-merge stages to provide carry signals based on the propagate and generate signals and a conditional sum generator to provide conditional sums based on the propagate and generate signals. The conditional sum generator includes ripple carry gates and XOR logic gates. The adder circuit also includes a plurality of multiplexers to receive the carry signals and the conditional sums and to provide an output based on the input signals.

21 Claims, 7 Drawing Sheets

SPARSE TREE ADDER CIRCUIT

FIELD

Embodiments of the present invention may relate to circuits. More specifically, embodiments of the present invention may relate to adder circuits.

BACKGROUND

Digital addition is a fundamental operation of processors and digital computer systems, not only to provide basic addition functions but also to provide many other logical operations. Addition and other arithmetic operations are generally performed by an arithmetic logic unit (ALU) contained with the computer's processor unit.

Additionally, high-performance processors may use a variety of memory management techniques to map a logical address to a physical address space. An address generation unit (AGU) is a component of a memory management block and may be used to compute an effective address of the location being addressed in memory.

Integer execution cores in processors may use high-performance adder cores to perform ALU/AGU operations in a signal clock cycle. The adder cores may be implemented using a high-fanout, dense carry-merge tree structure. This may result in high power consumption and high interconnect complexity. Further, the presence of multiple ALUs/AGUs in the execution core may result in a large layout footprint and hotspots on the die.

BRIEF DESCRIPTION OF THE DRAWINGS

The foregoing and a better understanding of embodiments of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and embodiments of the present invention are not limited thereto.

The following represents brief descriptions of the drawings in which like reference numerals represent like elements and wherein.

DETAILED DESCRIPTION

In the following detailed description, like reference numerals and characters may be used to designate identical, corresponding or similar components in differing figure drawings. Further, in the detailed description to follow, example sizes/models/values/ranges may be given although embodiments of the present invention are not limited to the same. Where specific details are set forth in order to describe example embodiments of the invention, it should be apparent to one skilled in the art that the invention can be practiced without these specific details.

Further, arrangements and embodiments may be described with respect to signal(s) and/or signal line(s). The identification of a signal or signal line may correspond to a single signal or a single signal line, or may be a plurality of signals or plurality of signal lines. Additionally, the terminology of signal(s) and signal line(s) may be used interchangeably.

Figure 1:
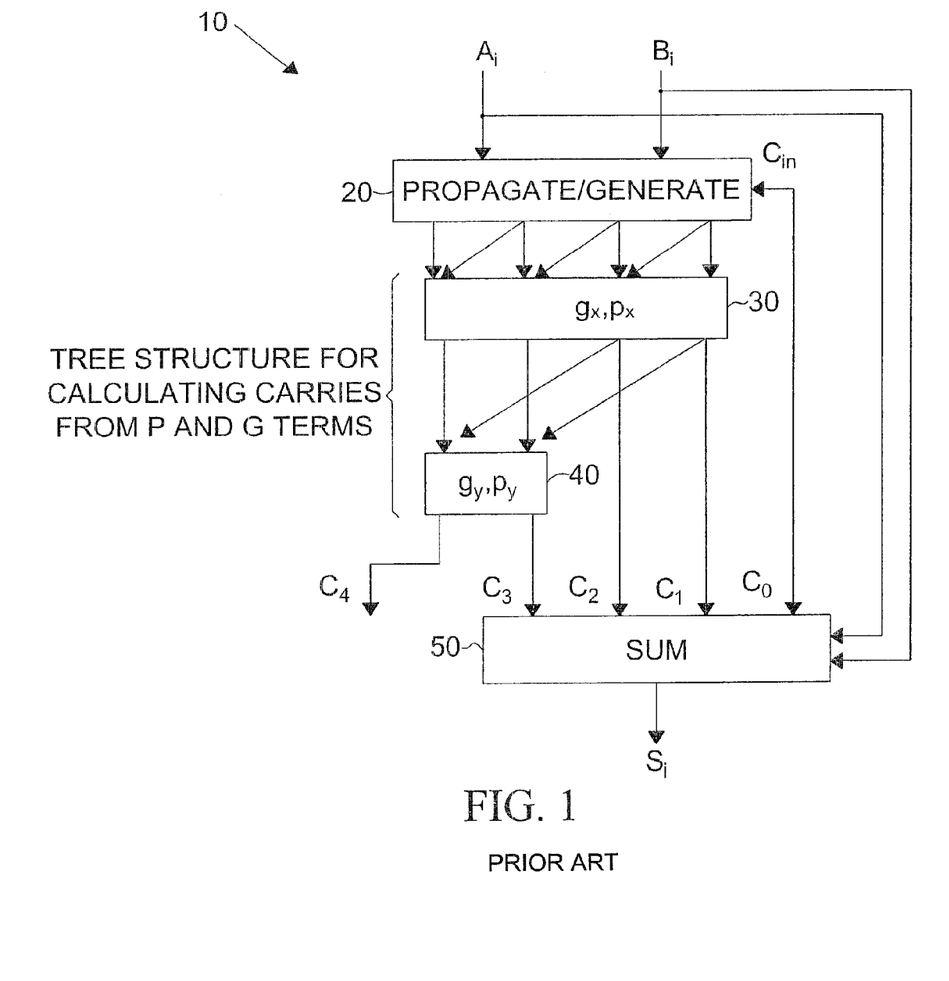
FIG. 1 is a block diagram of a Kogge-Stone adder according to an example arrangement.

FIG. 1 is a block diagram of a Kogge-Stone adder 10 according to an example arrangement. Other arrangements are also possible. In this example, two 4-bit signals $A_i$ and $B_i$, also called addends, are added together to form a SUM $S_i$. The $A_i$ and $B_i$ addends are fed into a propagate/generate circuit 20 along with a carry-in signal $C_{in}$. The carry-in signal $C_{in}$ also is fed unchanged into a SUM circuit 50 as a carry signal $C_0$.

Propagate and generate signals are generated within the propagate/generate circuit 20 and are subsequently output to a binary tree structure for calculating the carries. In this example, the tree structure includes a circuit 30 that calculates a first level ($g_x$, $p_x$) of generate and propagate signals along with carry signals $C_1$ and $C_2$. The tree structure also includes a circuit 40 that calculates a second level ($g_y$, $p_y$) of generate and propagate signals along with carry signals $C_3$ and $C_4$. Carry signals $C_1$-$C_3$ may be referred to as bit-carry signals, and carry signal $C_4$ may be referred to as a sum-carry signal.

The multi-level tree structure is characteristic of Kogge-Stone adder architecture and may be used to perform what is referred to as "carry-merging", "propagate/generate merging" or "P/G merging". However, as the number of bits in the addends increases, so do the number of levels (or stages) in the carry propagation tree. In general, if N represents the addend bit-width, then the number of P/G merging levels may be $\log_2 N$ (e.g., a bit-width of 16 requires 4 levels).

The addends $A_i$ and $B_i$ along with the carry signals $C_0$ through $C_3$ may be summed in the SUM circuit 50 to form the SUM $S_i$. The $C_4$ output of the circuit 40 may represent the carry signal for the SUM $S_i$.

Stated differently, a Kogge-Stone adder architecture operates to achieve a SUM by generating propagate and generate bits for each bit of the input, and then merging them to produce propagate and generate bits that represent successively larger groups of the input bits. The output of this merging are group generate bits representing whether a carry is generated or propagated from the least significant bit up to each bit position. The adder tree may thereby generate partial sums (such as bit A XOR'd with bit B) and carry-in signals. A propagate and generate circuit may be provided on a front end of the adder to generate the propagate and generate signals. An XOR gate may also be provided at a back end of the adder to perform an XOR operation on carries and partial sums. Thus, a total number of stages of the adder circuit may be computed as: number of states=$\log_2$ (bit width)+2.

The Kogge-Stone adder may be used in processor ALUs, due mainly to the logarithmic dependence on operand bit width, which may limit the depth of the carry propagation tree. Implementations may use radix-2 merges, in which two propagate and generate signals are merged in each stage of the tree. This may limit the stack height to two and then fan-out at every stage to two, which may help retain device sizes significantly smaller (and more energy efficient) than other comparable architectures. When using radix-4 merges, the stack height may increase to 4 and the fan-out may increase to 4, but the number of stages in the carry-merge tree may reduce by a factor of 2.

An AGU (or ALU) may receive four inputs, each from a different source. These four inputs may be summed together such as for memory addressing purposes. However, due to unique properties of addressing techniques, the sum of only three of these inputs may also be used as will be discussed in further detail below.

Figure 2:
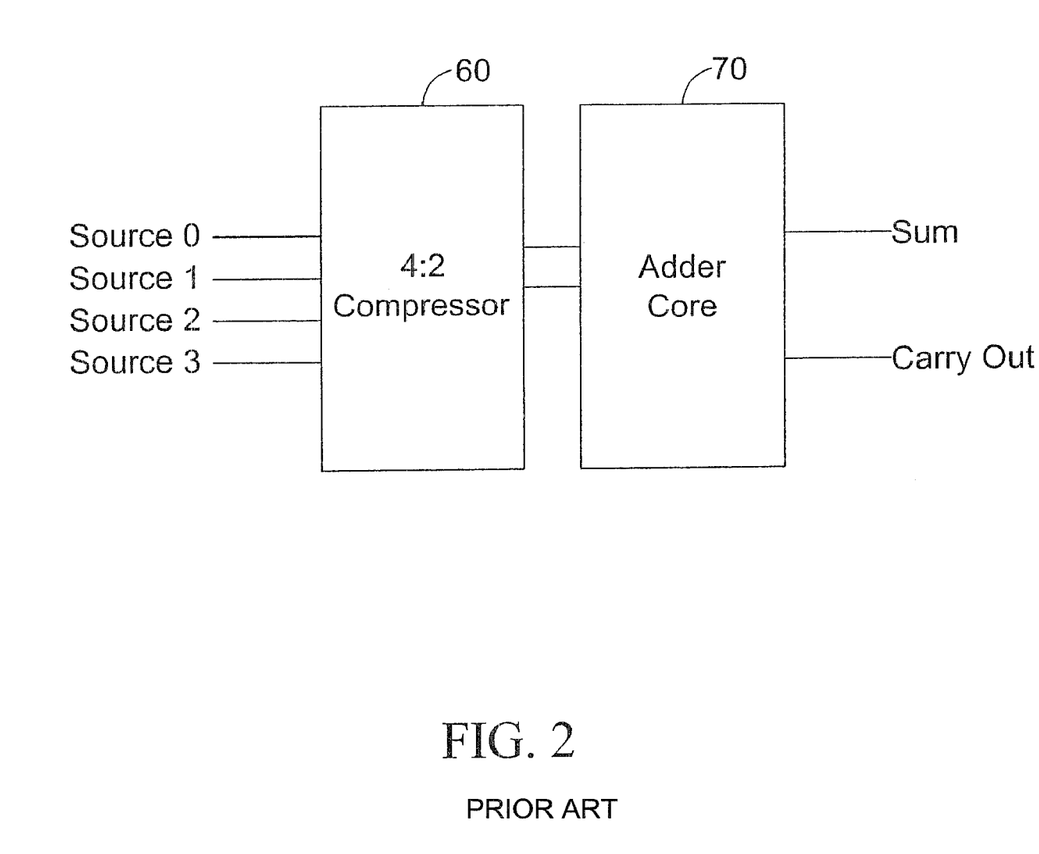
FIG. 2 is a block diagram of a dual-rail domino front-end multiplexer according to an example arrangement.

FIG. 2 is a block diagram of a dual-rail domino front-end multiplexer according to an example arrangement. Other arrangements are also possible. More specifically, FIG. 2 shows four inputs (Source0, Source1, Source2 and Source3) being input to a 4:2 compressor 60. These four sources (or inputs) may correspond to Base, Index, Segment and Displacement for an AGU, for example. Other sources or different numbers of inputs are also possible. The four inputs in this example may be summed without carry propagation using a 4:2 compressor 60, which can be composed of two 3:2 compressors, or full-adder circuits, in series. Alternate arrangements may utilize a different number of inputs, and therefore may use different compressor arrangements. Any number of inputs may be reduced to 2 inputs without carry-propagation using compressors. The output of the compressor will be 2 bits per bit position in carry-save format. The 4:2 compressor 60 may output signals to an adder core 70, which in turn provides a Sum signal and a Carry-out signal. In other words, the adder core 70 propagates the carry.

However, when only three of the inputs need to be summed then an additional carry-out may be needed from the sum of only three of the inputs. One method to obtain an additional carry-out from the sum of only three of the inputs is to create a second adder in parallel to the first adder. The second adder may use 3:2 compression and an additional adder core. However, this method may significantly increase the input load, layout area, and power consumption, as the circuit size has nearly doubled. Another method to obtain an additional carry-out from the sum of only three of the inputs may be to provide a second adder in series following the first adder core 70 to subtract one of the inputs (i.e., one of the sources). However, this method may increase the output loading and the delay.

Embodiments of the present invention may improve upon the power consumption and performance of high-performance ALUs/AGUs by using a sparse-tree design that reduces fanouts and wiring in an adder core while also leveraging the structure of the sparse-tree design to enable a fast carry-out from the sum of three ALU/AGU inputs. Embodiments of the present invention may utilize a sparse-tree adder circuit that leverages a noncritical nature of sidepaths to implement them using energy-efficient ripple carry (RC) adders. A lower transistor count and small transistor size of these adders may result in considerable savings in power consumption without affecting the delay of the adder.

Figure 3:
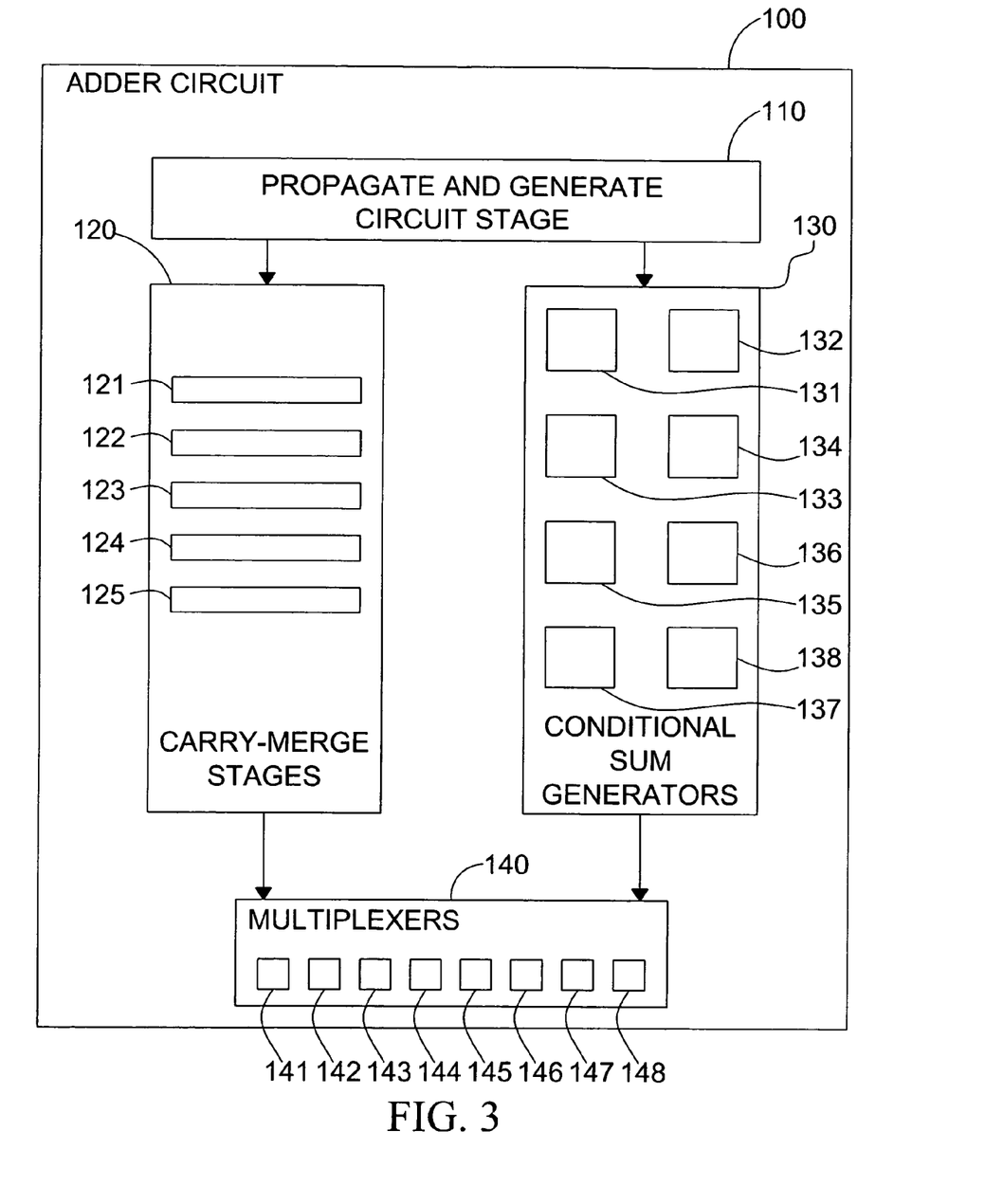
FIG. 3 illustrates a sparse-tree adder circuit according to an example arrangement.

FIG. 3 illustrates a sparse-tree adder circuit according to an example arrangement. Other arrangements are also possible. More specifically, FIG. 3 shows an adder circuit 100 having a propagate and generate circuit stage 110, a plurality of carry-merge stages 120, a plurality of conditional sum generators 130 and a plurality of multiplexers (or multiplexing devices) 140. The carry-merge stages 120 and the conditional sum generators 130 may be interleaved with one another for vertical data flow within each slice.

FIG. 3 shows five stages 121-125 of the plurality of carry-merge stages 120 although other numbers of stages are also possible. FIG. 3 also shows eight 4-bit multiplexers 141-148 of the plurality of multiplexers 140 although other numbers or bit-widths of multiplexers are also possible. Still further, FIG. 3 shows eight 4-bit conditional sum generators 131-138 of the plurality of conditional sum generators 130 although other numbers or bit-widths of conditional sum generators are also possible. The adder circuit 100 may include critical paths/sections (such as the carry-merge stages 120) and noncritical paths/sections (such as the conditional sum generators 130).

As will be described below with respect to FIG. 4, the propagate and generate circuit stage 110 provides propagate and generate signals to the plurality of carry-merge stages 120. The plurality of carry-merge stages 120 provide carry signals to the plurality of multiplexers 140 based on the propagate and generate signals. Additionally as will be described below with respect to FIGS. 5 and 6, the plurality of conditional sum generators 130 receive propagate and generate signals and provide conditional sums to the plurality of multiplexers 140. Accordingly, the plurality of multiplexers 140 receive the carry signals and the conditional sums and provide output signals based on the received signals.

Figure 4:
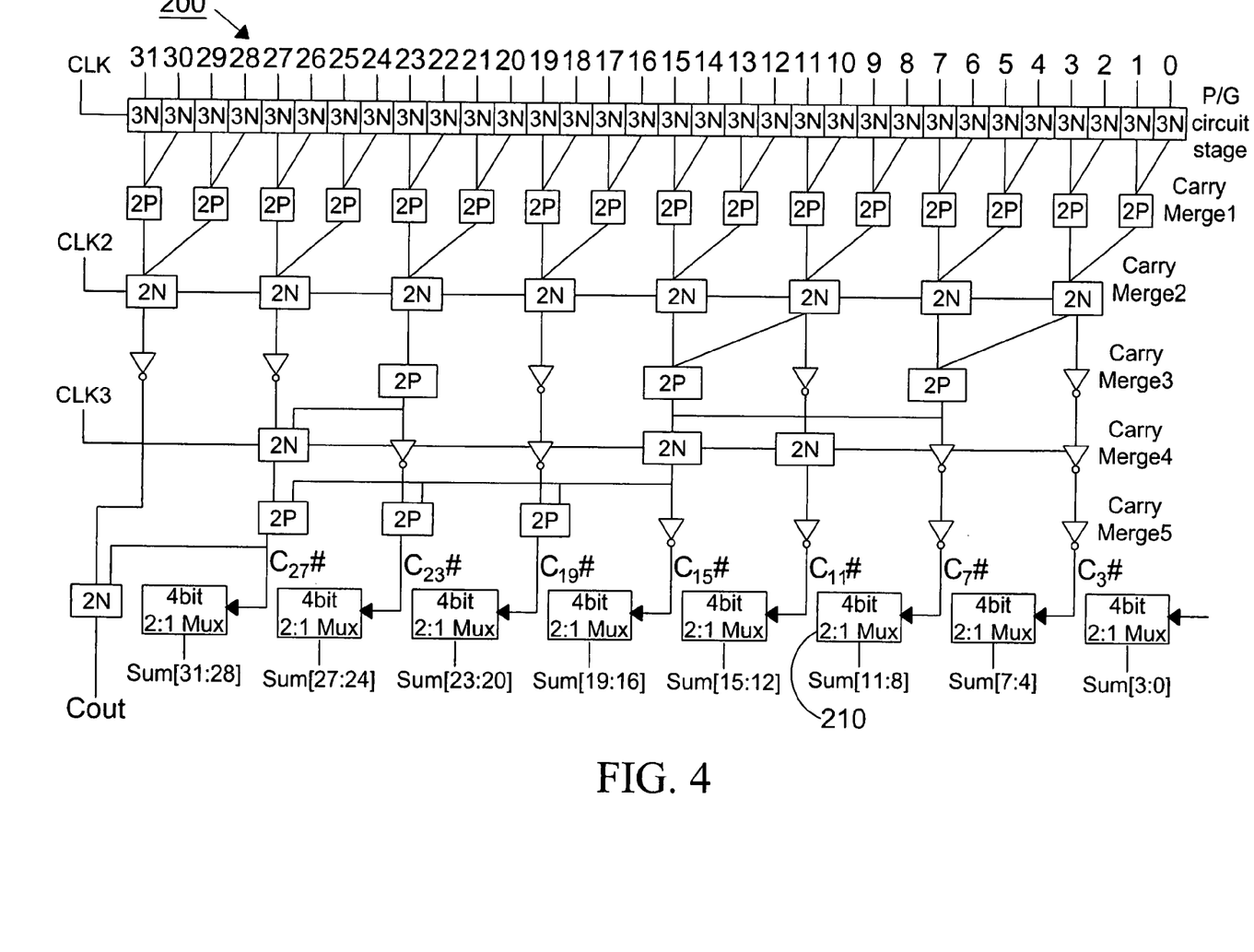
FIG. 4 illustrates portions of a sparse-tree adder circuit according to an example arrangement.

FIG. 4 illustrates portions of a sparse-tree adder circuit according to an example arrangement. Other arrangements are also possible. As discussed above with respect to FIG. 3, the adder circuit 100 may be divided into critical and noncritical sections or paths. This may speed up the critical path by moving a portion of the carry-merge logic to a noncritical sidepath. The terminologies of critical and noncritical sections/paths are terms of art and would be well known to one skilled in the art.

FIG. 4 shows a main tree 200 (or sparse-tree) that generates primary carries (shown as C3#, C7#, C11#, C15#, C19#, C23# and C27#). The main tree 200 forms the performance-setting critical path of the adder core and may be implemented in domino logic. As shown in FIG. 4, the critical path of the main tree 200 may include six stages for a 32 bit adder. These six stages include a propagate/generate (P/G) circuit stage followed by five stages of carry-merge stages (labeled CarryMerge1, CarryMerge2, CarryMerge3, CarryMerge4 and CarryMerge5). Each of these stages may be referred to as a carry-merge stage. The P/G circuit stage shown in FIG. 4 may correspond to the propagate and generate circuit stage 110 shown in FIG. 3. Additionally, the five carry-merge stages shown in FIG. 4 may correspond to the carry-merge stages 121-125 shown in FIG. 3.

As compared to a Kogge-Stone carry-look ahead tree, the sparse-tree adder circuit having the main tree 200 such as shown in FIG. 4 does not generate carries for every bit of the adder circuit. Rather, the main tree 200 may generate only 1 in 4 carries. Other numbers of carries are also possible. For example, a main tree of a sparse-tree adder circuit may generate 1 in 16 carries or 1 in 8 carries. As a result of only generating 1 of 4 carries, for example, the critical path may be reduced. For example, the sparse-tree adder circuit may have approximately 50% reduced fan-out on the group generate signals and approximately 33% lower fanout on the group propagate signals. This may result in approximately 18% speedup in a critical path as compared to a Kogge-Stone adder. Additionally this may result in an 80% reduction in interconnect complexity.

When utilizing a sparse-tree adder circuit, conditional sums may also be generated by conditional sum generators (such as the conditional sum generators 130 shown in FIG. 3). One of the conditional sums may be based on the carry-in being a 0 and the other conditional sum may be based on the carry-in being a 1. The generation of conditional sums allows an XOR operation to be performed earlier within the adding process. A conditional sum generator may perform an XOR operation on a partial sum and both versions of the conditional carry (i.e., both a conditional carry based on a 0 carry-in and a conditional carry based on a 1 carry-in). The conditional sum generator may then choose or select the appropriate conditional sum of each four-bit block, for example, based on the carry-in signal from the sparse tree for that 4-bit block.

Figure 5:
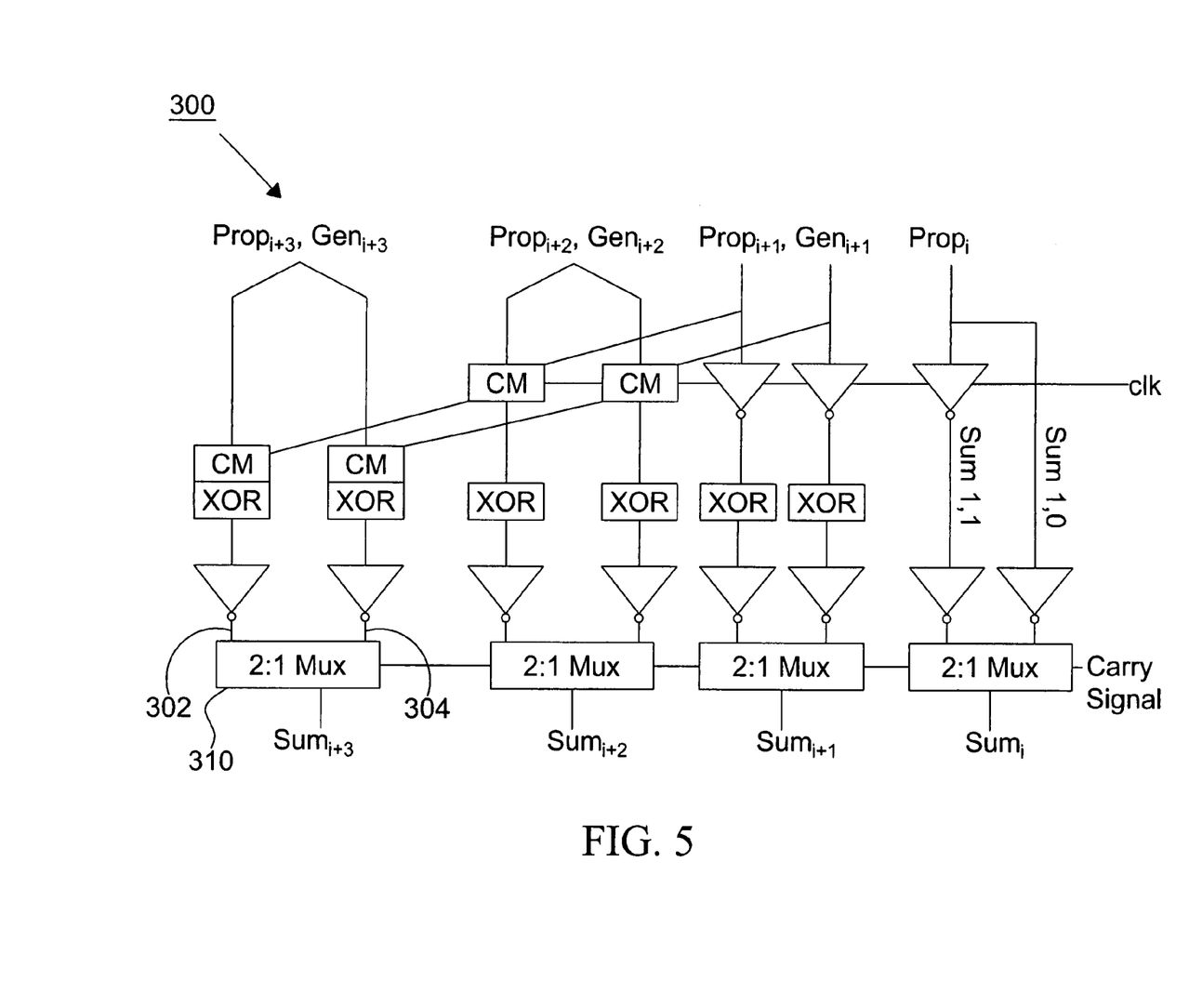
FIG. 5 illustrates a conditional sum generator to generate conditional sums according to an example arrangement.

FIG. 5 illustrates a conditional sum generator to generate conditional sums according to an example arrangement. Other arrangements are also possible. More specifically, the noncritical section of the adder circuit may include a 4-bit conditional sum generator 300 as shown in FIG. 5 to generate two sums, one sum assuming an input (primary) carry of 0 and the other sum assuming an input carry of 1. The conditional sum generator 300 shown in FIG. 5 may correspond with one of the conditional sum generators 130 shown in FIG. 3. The conditional sum generator 300 may receive propagate and generate signals from the propagate and generate circuit stage 110.

In FIG. 5, two conditional sums may be produced relating to each bit. For example, the conditional sum generator 300 may provide conditional sums 302 and 304. One of these conditional sum signals represents a carry-in of 0 to the 4 bit block and the other conditional sum signal represents a carry-in of 1 to the 4 bit block. The signals 302 and 304 are applied to a 2:1 multiplexer 310 that also receives a carry signal from the main tree 200 of FIG. 4. FIG. 5 shows each of the conditional sums 302, 304 output from inverter circuits (acting as buffers). However, in at least one arrangement, the inverters may not be present and therefore the 2:1 multiplexer 310 (and the other multiplexers shown in FIG. 5 may be provided one stage earlier).

The 2:1 multiplexer 310 corresponds to one of the 2:1 multiplexers in FIG. 4 and also may correspond to one of the plurality of multiplexers 140 in FIG. 3. As one example, the 2:1 multiplexer 310 corresponds to 2:1 multiplexer 210 in FIG. 4. The 2:1 multiplexer 310/210 receives the carry signal C7# generated by the main tree 200. Each carry signal input to the multiplexer 310/210 selects one of the input signals 302, 304 so as to output a final adder output (of each 4-bit block). This output is shown as $SUM_{i+3}$ in FIG. 5. Stated differently, the critical and noncritical sections or paths of the adder circuit converge at the 2:1 multiplexers where the 1-in-4 carries generated by the main tree (or sparse-tree) choose/select the appropriate conditional sums to deliver the final sum.

The noncriticality of the sum generator may permit the use of a ripple carry-merge scheme to generate the conditional carries (and conditional sums). The use of ripple-carry adder topology may result in a lower average transistor size and a lower transistor count as compared to a Kogge-Stone implementation. This may result in an approximately 30% lower power consumption, for example.

More specifically, the conditional sum generator may produce conditional sums based on propagate and generate signals generated for each of the respective 4 bits (i.e., within a 4-bit block). These propagate and generate signals may be obtained from the propagate and generate circuit stages within a main tree, such as the main tree 200 in FIG. 4 (and may correspond to the output signals from the propagate/generate circuit 20 shown in FIG. 1).

Embodiments of the present invention may exploit the ripple-carry structure of the noncritical sidepath (in a conditional sum generator) in order to obtain an additional carry-out using a sum of only three of the inputs.

Embodiments of the present invention may provide a plurality of conditional sum generators each to provide two conditional sums based on propagate and generate signals provided by a propagate and generate circuit stage (such as the propagate and generate circuit stage 110 shown in FIG. 3).

Each conditional sum generator (such as one of the conditional sum generators 131-135 shown in FIG. 3) may include ripple carry (RC) gates, such as ripple carry adders, and logic gates/circuits, such as XOR logic gates. The logical XOR gates may be provided on different stages or levels of the conditional sum generator. Additionally, the ripple carry gates may perform a subtraction operation after the corresponding XOR logic circuits determine carry-out signals.

Figure 6:
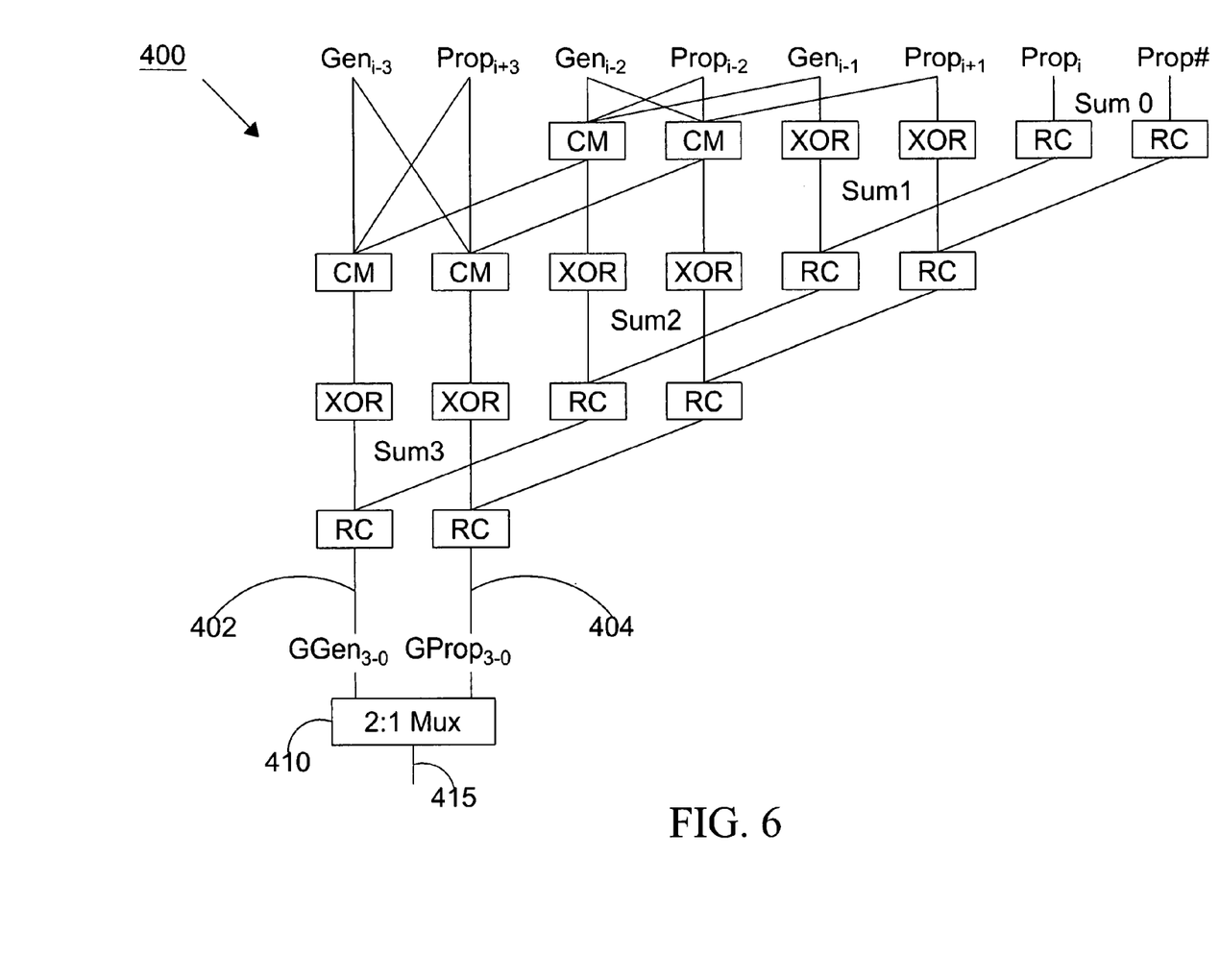
FIG. 6 illustrates a conditional sum generator to generate conditional sums according to an example embodiment of the present invention.

FIG. 6 illustrates a conditional sum generator to generate conditional sums according to an example embodiment of the present invention. Other embodiments and configurations are also within the scope of the present invention. More specifically, FIG. 6 shows a noncritical 4-bit conditional sum generator 400 having a 4-bit conditional subtractor. The conditional sum generator 400 shown in FIG. 6 may correspond with one of the conditional sum generators 130 shown in FIG. 3. As compared to the FIG. 5 arrangement, the XOR gates within the conditional sum generator 400 may be provided such that one conditional sum bit is available after each gate delay. Ripple carry adders may have a one-gate delay difference between the arrival of each output bit from the least significant bit to the most significant bit. When a conditional subtractor is not needed, the XOR gates can be located in parallel before the 2:1 multiplexer since the conditional sums are needed simultaneously. However, when a conditional subtractor is added to the circuit, an advantageous implementation may result when the XOR gates immediately follow the ripple-carry gates. Conditional carry-outs may be generated from each four bit section after subtracting one of the inputs (i.e., an input source) as shown in FIG. 5.

More specifically, the FIG. 5 arrangement of the conditional sum generator 300 shows a plurality of XOR gates (or XOR logic gates) labeled XOR operating at a same stage/level of the conditional sum generator. However, in embodiments of the present invention, a subtraction operation may be performed after the XOR gates in the noncritical path. Accordingly, the XOR gates (labeled XOR) may be provided at an earlier time period within the conditional sum generator 400 as compared to within the conditional sum generator 300 of the FIG. 5 arrangement. For example, FIG. 6 shows the XOR gates (labeled XOR) lined up in a diagonal manner and at different levels/stages of the conditional sum generator 400. In other words, the ripple carry gates (labeled RC) perform a subtraction operation after the corresponding XOR gates determine carry-out signals.

The ripple carry gates (RC) may be 3-input ripple-carry carry gates also known as full-adders. That is, the inputs to the RC gates may be the conditional sums, the ripple carry-in and the primary input that needs to be subtracted. The RC gates are provided to perform the subtraction of one of the sources. Each RC gate in the FIG. 6 conditional sum generator 400 corresponds to two gates with identical inputs, except for the first gates receiving Sum0. Here the carry-in signal of one is set to a logic '1' while the other is set to a logic '0'. Thus there may be four chains of full-adders in each 4-bit block. One chain receives conditional-sum-0 and carry-in of 0, another chain receives conditional-sum-1 and carry-in of 0, another chain receives conditional-sum-0 and carry-in of 1, and another chain receives conditional-sum-1 and carry-in of 1. The carry-in determines whether the carry output of the added ripple-carry chain corresponds to a propagate signal (1) or a generate signal (0). Thus the four outputs from the added ripple-carry chain may represent conditional propagate (2 bits) and conditional generate (2 bits) signals for the subtraction within that 4-bit block. An additional multiplexer 410 may then select the correct propagate and generate signals for the subtraction using the same sparse-tree carry signal as the multiplexers shown in FIG. 5 (and corresponding to the multiplexers shown in FIG. 4). The multiplexer 410 may be a 2-bit output multiplexer.

The multiplexer 410 may be in addition to the multiplexers shown in FIG. 5. Thus, the 4-bit outputs of FIG. 5 may correspond to the 6-bit outputs with the addition of the multiplexer 410 (resulting from the subtraction). Accordingly, with the addition of the subtractor shown in FIG. 6, there are two propagate signals (one assuming a carry-in of 0 and the other assuming a carry-in of 1) and two generate signals (one assuming a carry-in of 0 and the other assuming a carry-in of 1). This may result in two or more additional multiplexers in FIG. 5 (and thus the overall output of the conditional sum generator may be 6 bits). The selector on all the multiplexers may be the carry-in from the main tree. The two additional multiplexers (corresponding to the multiplexer 410) may be moved to a later stage than the multiplexers of FIG. 5. The multiplexers of FIG. 5 and the multiplexers of FIG. 6 may be merged at the multiplexer level of FIG. 4 to give a final carry-out. The above and below description and figures may relate to a plurality of multiplexers having a plurality of output bits, and that the plurality of multiplexers may be combined into a single multiplexer having the plurality of output bits.

In FIG. 6, two conditional sums may be produced relating to each bit. For example, the conditional sum generator 400 may produce conditional sums $GGen_{3-0}$ and $GProp_{3-0}$ labeled 402 and 404, respectively. One of the conditional sum signals represents a carry-in of 0 to the 4 bit block and the other conditional sum signal represents a carry-in of 1 to the 4 bit block. The signals 402 and 404 may be applied to a sum multiplexer 410 (or sum multiplexing device) that also receives a carry signal from the main tree 200 of FIG. 4. The sum multiplexer 410 may be in addition to the multiplexer 310 shown in FIG. 5 (which may correspond to the multiplexer 210 shown in FIG. 4 and/or one of the multiplexers 140 shown in FIG. 3). Thus, the multiplexer 410 receives the carry signal C7#, for example, from the main tree 200 to select one of the input signals (i.e., to select one of the propagates and one of the generates). Based on the carry signal, a signal 415 is output from the multiplexer (of each 4 bit block). These conditional carry-outs may be logically equivalent to the group propagate and generate signals from such a four-bit stage of a 3-input adder. By using these group propagate and generate signals, the carry-out may be obtained using log2(bit width/4) stages of carry-merge (CM) gates as in the adder critical path. For a 16-bit adder, this may result in only 2 additional stages of carry merge (CM), as in blocks 30 and 40 of FIG. 1, thereby producing the carry-out only one gate stage after the original 4-bit sum. Therefore, by beginning the logic gates to compute the additional carry-out early, before the original sum is known, ripple-carry (RC) gates can be used to reduce power consumption and area, while simultaneously keeping the delay of the carry-out to a minimum.

Figure 7:
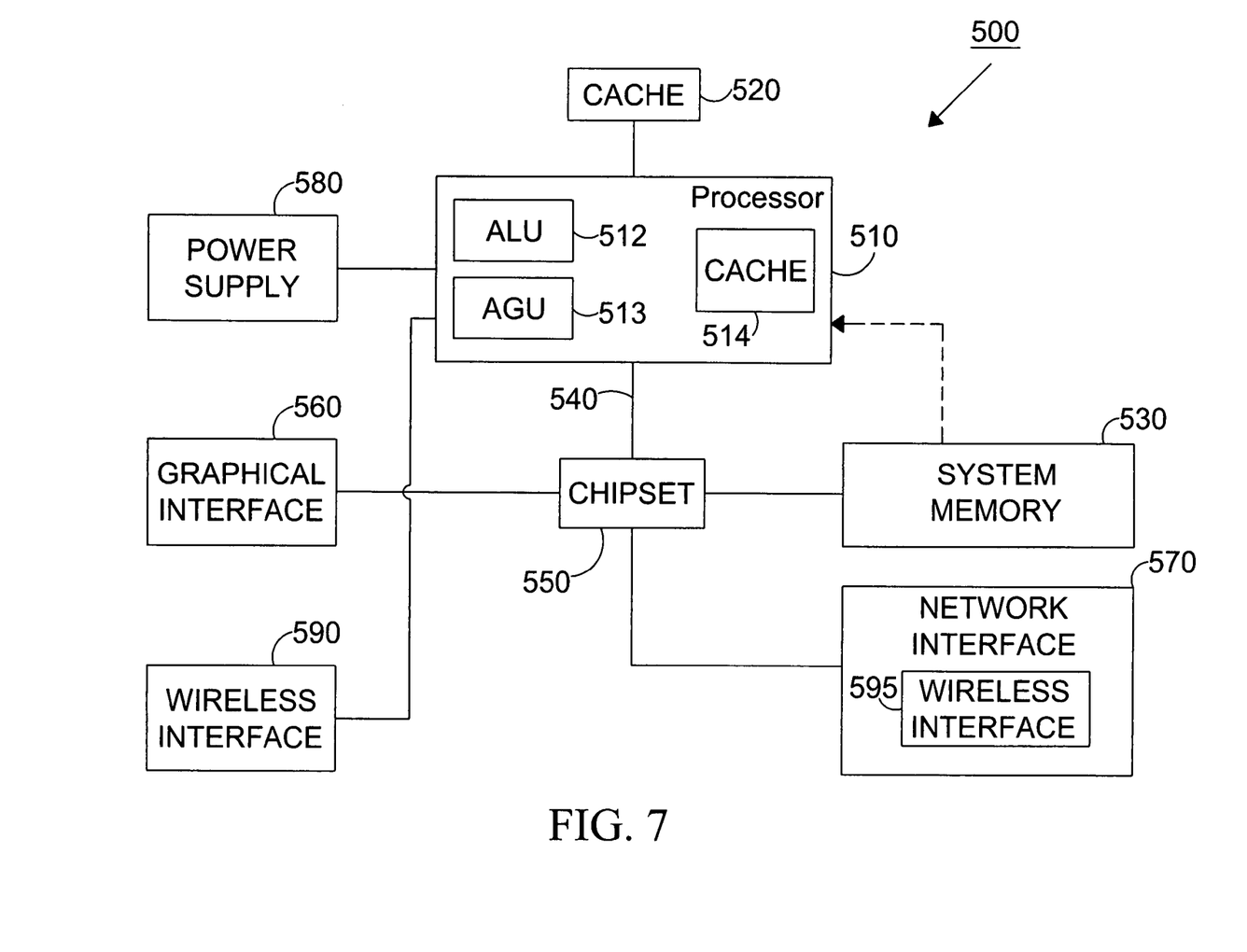
FIG. 7 is a block diagram of a system according to an example embodiment of the present invention.

FIG. 7 is a block diagram of a system (such as a computer system 500) according to an example embodiment of the present invention. Other embodiments and configurations are also within the scope of the present invention. More specifically, the computer system 500 may include a processor 510 that may have many sub-blocks such as an arithmetic logic unit (ALU) 512, an address generation unit (AGU) 513 and an on-die (or internal) cache 514. The processor 510 may also communicate to other levels of cache, such as off-die cache 520. Higher memory hierarchy levels such as a system memory 530, such as RAM, may be accessed via a host bus 540 and a chip set 550. The system memory 530 may also be accessed in other ways, such as directly from the processor 510 and/or without passing through the host bus 540 and/or the chip set 550. In addition, other off-die functional units such as a graphical interface 560 and a network interface 570, to name just a few, may communicate with the processor 510 via appropriate busses or ports. The processor 510 may also be powered by an external power supply 580. The system may also include a wireless interface 590 or 595 to interface the system 500 with other systems, networks, and/or devices via a wireless connection. The various techniques discussed above relating to the adder circuit (including a conditional sum generator having a conditional subtractor) may be performed using the circuitry discussed above within the processor 510, for example.

As one example, the ALU 512 may perform a wide variety of logic and arithmetic functions. The ALU 512 may include at least one adder circuit (including features discussed above) for performing arithmetic operations such as addition, multiplication, subtraction, comparison and shift. Also as an example, the AGU 513 may perform a wide variety of address computations, resulting in the effective address for a cache or external memory based upon a variety of addressing modes from processor instructions and the current state of the processor.

Systems represented by the various foregoing figures can be of any type. Examples of represented systems include computers (e.g., desktops, laptops, handhelds, servers, tablets, web appliances, routers, etc.), wireless communications devices (e.g., cellular phones, cordless phones, pagers, personal digital assistants, etc.), computer-related peripherals (e.g., printers, scanners, monitors, etc.), entertainment devices (e.g., televisions, radios, stereos, tape and compact disc players, video cassette recorders, camcorders, digital cameras, MP3 (Motion Picture Experts Group, Audio Layer 3) players, video games, watches, etc.), and the like.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments of the present invention have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. An adder circuit comprising:
   a propagate and generate circuit stage to provide propagate signals and generate signals;
   a plurality of carry-merge stages to receive the propagate signals and the generate signals from the propagate and generate circuit stage, the plurality of carry-merge stages to provide carry signals based on the propagate signals and the generate signals received from the propagate and generate circuit stage;

a conditional sum generator to receive the propagate signals and the generate signals from the propagate and generate circuit stage, the conditional sum generator to provide conditional sum signals based on the propagate signals and the generate signals received from the propagate and generate circuit stage, the conditional sum generator including ripple carry gates and logical exclusive OR (XOR) gates, the logical XOR gates being provided on different stages of the conditional sum generator; and a plurality of multiplexers to receive the carry signals from the carry-merge stages and to receive the conditional sum signals from the conditional sum generator, and each of the multiplexers to provide an output based on the corresponding received signals.

2. The adder circuit of claim 1, wherein each of the multiplexers selects one of the received conditional sum signals based on the received carry signal.

3. The adder circuit of claim 1, wherein the conditional sum generator provides carry-out signals prior to determining a conditional sum signal.

4. The adder circuit of claim 1, wherein the ripple carry gates perform a subtraction operation after the corresponding logical XOR gates provide carry-out signals.

5. The adder circuit of claim 1, wherein the conditional sum generator is provided in a noncritical sidepath of the adder circuit.

6. The adder circuit of claim 1, wherein each of the multiplexers corresponds to a plurality of input bits.

7. The adder circuit of claim 1, wherein the conditional sum generator provides two conditional sum signals for each input bit.

8. An adder comprising:

a propagate and generate circuit stage to provide propagate signals and generate signals based on a plurality of input bits;

a plurality of conditional sum generators each to provide two conditional sum signals based on the corresponding propagate signal and the corresponding generate signal received from the propagate and generate circuit stage, each conditional sum generator including ripple carry gates and XOR logic gates, the XOR logic gates of each conditional sum generator being provided on a plurality of different stages of the corresponding conditional sum generator; and a plurality of multiplexers each to separately receive the two conditional sum signals from a corresponding one of the plurality of conditional sum generators.

9. The adder of claim 8, wherein the ripple carry gates for each conditional sum generator are provided on the plurality of different stages of the conditional sum generator.

10. The adder of claim 8, further comprising a plurality of carry-merge stages to receive the propagate signals and the generate signals from the propagate and generate circuit stage, the plurality of carry-merge stages to provide carry signals based on the propagate signals and the generate signals received from the propagate and generate circuit stage.

11. The adder of claim 10, wherein each of the multiplexers separately selects one of the input two conditional sum signals based on one of the carry signals provided by one of the carry-merge stages.

12. The adder of claim 8, wherein the ripple carry gates perform a subtraction operation after the XOR logic gates provide carry-out signals.

13. The adder of claim 8, wherein the plurality of conditional sum generators are provided in a noncritical sidepath of the adder.

14. The adder of claim 8, wherein each of the multiplexers corresponds to the plurality of input bits.

15. A system comprising:

a memory device to store data;

a wireless interface to interface with devices; and a processor to process data, the processor including an adder circuit to access data within the memory device, the adder circuit including:

a conditional sum generator to provide two conditional sum signals based on propagate signals and generate signals, the conditional sum generator including ripple carry gates and logical exclusive OR (XOR) gates, the logical XOR gates provided on a plurality of different stages of the conditional sum generator; and a multiplexer to receive the two conditional sum signals and to provide an output based on a received carry signal.

16. The system of claim 15, wherein the adder circuit further includes:

a propagate and generate stage to provide the propagate signals and the generate signals based on a plurality of input bits; and a plurality of carry-merge stages to provide catty signals based on the propagate signals and the generate signals from the propagate and generate stage.

17. The system of claim 15, wherein the multiplexer selects one of the two conditional sum signals based on the received carry signal.

18. The system of claim 15, wherein the conditional sum generator provides carry-out signals prior to determining a conditional sum signal.

19. The system of claim 15, wherein the condition sum generator is provided in a noncritical sidepath of the adder circuit.

20. The system of claim 15, wherein the multiplexer corresponds to the plurality of input bits.

21. The system of claim 15, wherein the ripple carry gates perform a subtraction operation after the logical XOR gates provide carry-out signals.

* * * * *